United States Patent
Hada et al.

(10) Patent No.: US 6,501,719 B1
(45) Date of Patent: Dec. 31, 2002

(54) RECORDING MEDIUM REPRODUCING APPARATUS

(75) Inventors: Atsushi Hada, Saitama-ken (JP); Akira Shimizu, Saitama-ken (JP); Kuniyasu Harigai, Saitama-ken (JP); Masayuki Kimura, Saitama-ken (JP)

(73) Assignee: Pioneer Corporation, Tokyo (JP)

( * ) Notice: Subject to any disclaimer, the term of this patent is extended or adjusted under 35 U.S.C. 154(b) by 154 days.

(21) Appl. No.: 09/605,058

(22) Filed: Jun. 28, 2000

(30) Foreign Application Priority Data

Jul. 2, 1999 (JP) .......................................... 11-188597

(51) Int. Cl.$^7$ .............................................. G11B 33/02
(52) U.S. Cl. ...................................................... 369/75.1
(58) Field of Search ............................... 369/75.1, 77.1, 369/30.9, 31.01, 79; 361/724; 49/371; 248/27.1, 27.3; 292/263, 110, 109, 196

(56) References Cited

U.S. PATENT DOCUMENTS

| | | | | |
|---|---|---|---|---|
| 5,010,437 A | * | 4/1991 | Utsugi et al. | 360/137 |
| 5,038,238 A | * | 8/1991 | Kim | 360/137 |
| 5,127,683 A | * | 7/1992 | Sato et al. | 292/113 |
| 5,177,730 A | * | 1/1993 | Utsugi | 360/137 |
| 5,848,042 A | * | 12/1998 | Takahashi et al. | 360/137 |
| 5,852,594 A | * | 12/1998 | Kaise et al. | 360/99.02 |
| 5,953,302 A | * | 9/1999 | Kobayashi | 361/814 |

FOREIGN PATENT DOCUMENTS

| | | | |
|---|---|---|---|
| DE | 4000425 A1 | * | 10/1990 |
| JP | 02193386 A | * | 7/1990 |
| JP | 02285578 A | * | 11/1990 |
| JP | 09154615 A | * | 6/1997 |
| JP | 09321640 A | * | 12/1997 |
| JP | 09321641 A | * | 12/1997 |

* cited by examiner

Primary Examiner—William Klimowicz
(74) Attorney, Agent, or Firm—Arent Fox Kintner Plotkin & Kahn, PLLC (57) ABSTRACT

A recording medium reproducing apparatus includes: an apparatus main body having a recording medium insertion opening; a flap body adapted to be attached to the apparatus main body so as to close the insertion opening; a first gear formed on the flap body, the first gear being coaxial with pivotal shafts of the flap body; a second gear provided in the apparatus main body and engageable with the first gear formed on the flap body; an arm member protruding from the front side of the apparatus main body, the arm member being retractable into the apparatus main body upon being pressed by the flap body when the flap body is closed on the apparatus main body; an interlock mechanism for simultaneously effecting the protrusion or retraction of the arm member and the rotation of the second gear provided in the apparatus main body; a first urging device for urging the interlock mechanism so as to cause the arm member to outwardly project to its fully projected position. Therefore, the above arm member may be urged to its projected position so as to open the flap body.

6 Claims, 9 Drawing Sheets

RECORDING MEDIUM REPRODUCING APPARATUS

BACKGROUND OF THE INVENTION

The present invention relates to a recording medium reproducing apparatus for use in a motor vehicle, particularly to a flap body opening/closing mechanism for use in the recording medium reproducing apparatus.

As well known, a recording medium reproducing apparatus has an elongated opening (formed on a front panel of an apparatus main body) allowing insertion of a recording medium such as a CD (compact disc) and an MD (mini disc). Such an elongated opening may be closed or opened by a flap body when it is attached to or detached from the apparatus main body. If a flap body is also provided with a display section and a button operating section, such a flap body may also be referred to as operation flap.

When a user wants to reproduce a recording medium with the use of the above described reproducing apparatus, the flap body is opened so as to expose the elongated opening formed on the front panel of the apparatus main body. Then, a recording medium such as a CD is inserted through the elongated opening into the apparatus main body, so that the CD is automatically loaded on to a reproducing position. Thus, the loaded CD may be reproduced by operating the buttons on the front surface of the flap body.

In fact, the flap body of the reproducing apparatus may be opened or closed, either automatically with the use of a motor, or manually by making use of an empty weight of the flap body itself.

If the flap body of the reproducing apparatus is opened or closed with the use of a driving force produced by a motor, the opening/closing operation may be performed in a smooth manner. However, such kind of an automatic opening/closing operation will cause a reproducing apparatus to have a complex internal structure and increased parts, hence increasing a production cost.

Moreover, if a flap body is made detachable from the apparatus main body so that a user can carry it away when he or she leaves his or her vehicle, the reproducing apparatus with its flap body removed will cause people to feel that the reproducing apparatus as a whole has been removed from the vehicle, thereby providing an effect of preventing a possible theft. However, such a detachable type flap body will cause the reproducing apparatus as a whole to become more complex, hence bringing about a further increase in the manufacturing cost.

On the other hand, if a flap body of a reproducing apparatus is opened or closed manually by making use of an empty weight of the flap body itself, it is allowed to have a simple structure such as a pressure attachment structure capable of effecting an easy opening/closing of the flap body. The manually operable structure is favourable in manufacturing a reproducing device at a low cost. However, since an initial flap opening speed using a spring is different from its middle period speed using an empty weight, it is difficult to open the flap body in a smooth manner, hence bring about an uncomfortable feeling when opening and closing the flap body.

SUMMARY OF THE INVENTION

It is an object of the present invention to provide an improved low-cost reproducing apparatus having a flap body (operation flap) which can be smoothly opened and closed in a manual operation and can be easily removed from the apparatus main body, so as to solve the above-mentioned problems peculiar to the above-discussed prior arts.

According to the present invention, there is provided a recording medium reproducing apparatus, comprising: an apparatus main body having a recording medium insertion opening; a flap body adapted to be attached to the apparatus main body so as to close the insertion opening; a first gear formed on the flap body, said first gear being coaxial with pivotal shafts of the flap body; a second gear provided in the apparatus main body and engageable with the first gear formed on the flap body; an arm member protruding from the front side of the apparatus main body, said arm member being retractable into the apparatus main body upon being pressed by the flap body when the flap body is closed on the apparatus main body; an interlock mechanism for simultaneously effecting the protrusion or retraction of the arm member and the rotation of the second gear provided in the apparatus main body; a first urging means for urging the interlock mechanism so as to cause the arm member to outwardly project to its fully projected position.

In one aspect of the present invention, the interlock mechanism comprises: the arm member; said second gear and a third gear coaxial with the second gear; a fourth gear which is engaged with the third gear and is urged by the first urging means in its circumferential direction; a projection formed on one side of the fourth gear; an engaging portion formed on the arm member for engaging the projection of the fourth gear.

In another aspect of the present invention, the first urging means is a coiled spring capable of urging the fourth gear in its rotational direction.

In a further aspect of the present invention, the apparatus main body comprises a pair of clamping members each capable of slidably clamping a pivotal shaft of the flap body by virtue of a second urging means provided within the apparatus main body.

In a still further aspect of the present invention, one end of each clamping member is pivotably supported on the interlock mechanism, the other end of the clamping member is pressed by the second urging means and acts as a free end; a pair of fixed protruding members are formed on the front side of the apparatus main body; the pivotal shafts of the flap body are slid,ably clamped between the fixed protruding members and the clamping members.

In one more aspect of the present invention, the second urging means is a coiled spring.

The above objects and features of the present invention will become better understood from the following description with reference to the accompanying drawings.

DETAILED DESCRIPTION OF THE PREFERRED EMBODIMENTS

A preferred embodiment of a recording medium reproducing apparatus made according to the present invention will be described below with reference to FIGS. 1 to 6. In these figures, direction Y is used to define a recording medium insertion direction in which a recording medium is inserted into the reproducing apparatus main body, direction X is used to define a longitudinal direction of an elongated opening formed on the front panel of the apparatus main body, direction Z is used to define a direction perpendicular to both direction X and direction Y.

Figure 1:
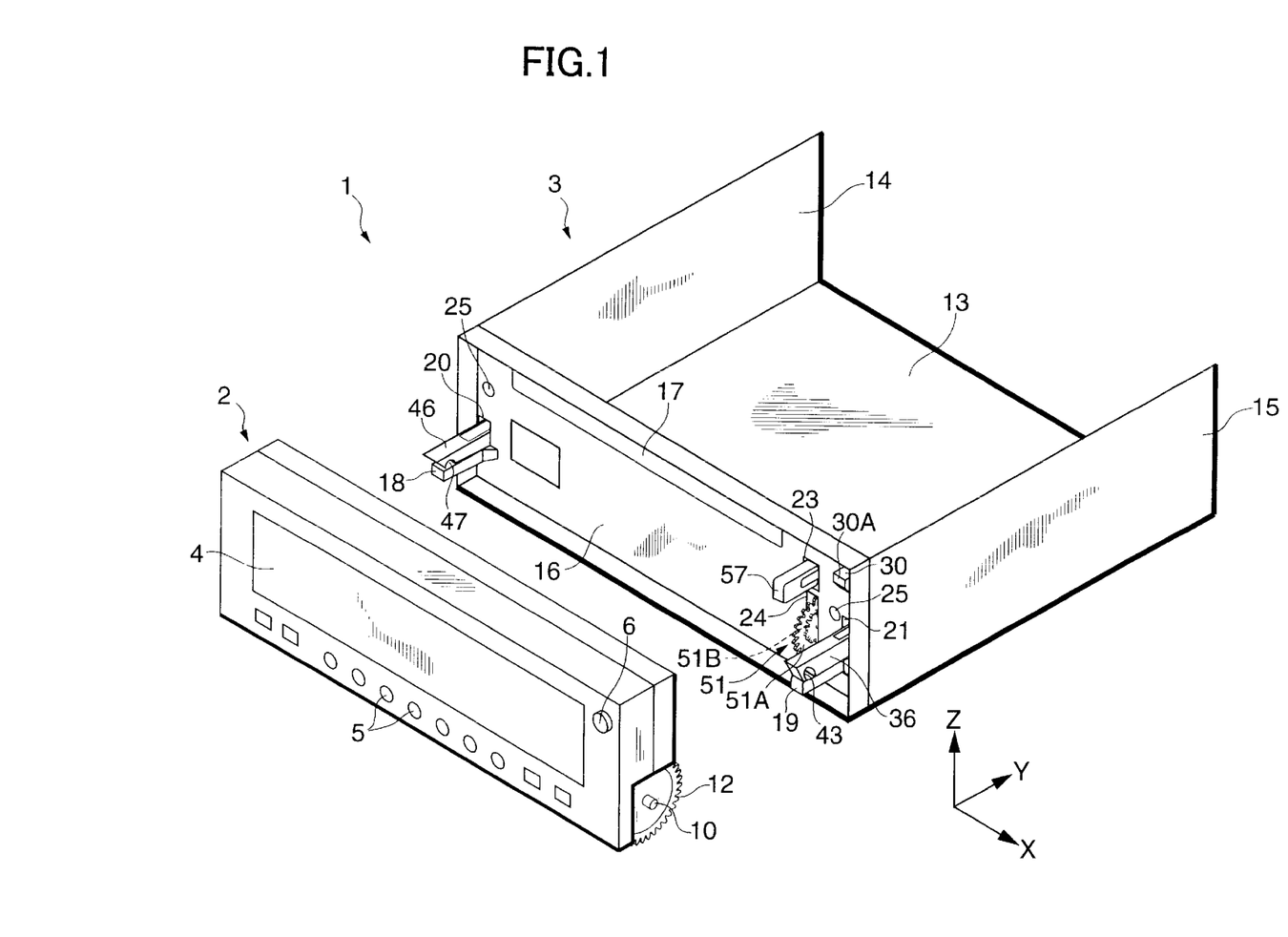
FIG. 1 is a perspective view indicating a recording medium reproducing apparatus to which the present invention has been applied.
Figure 2:
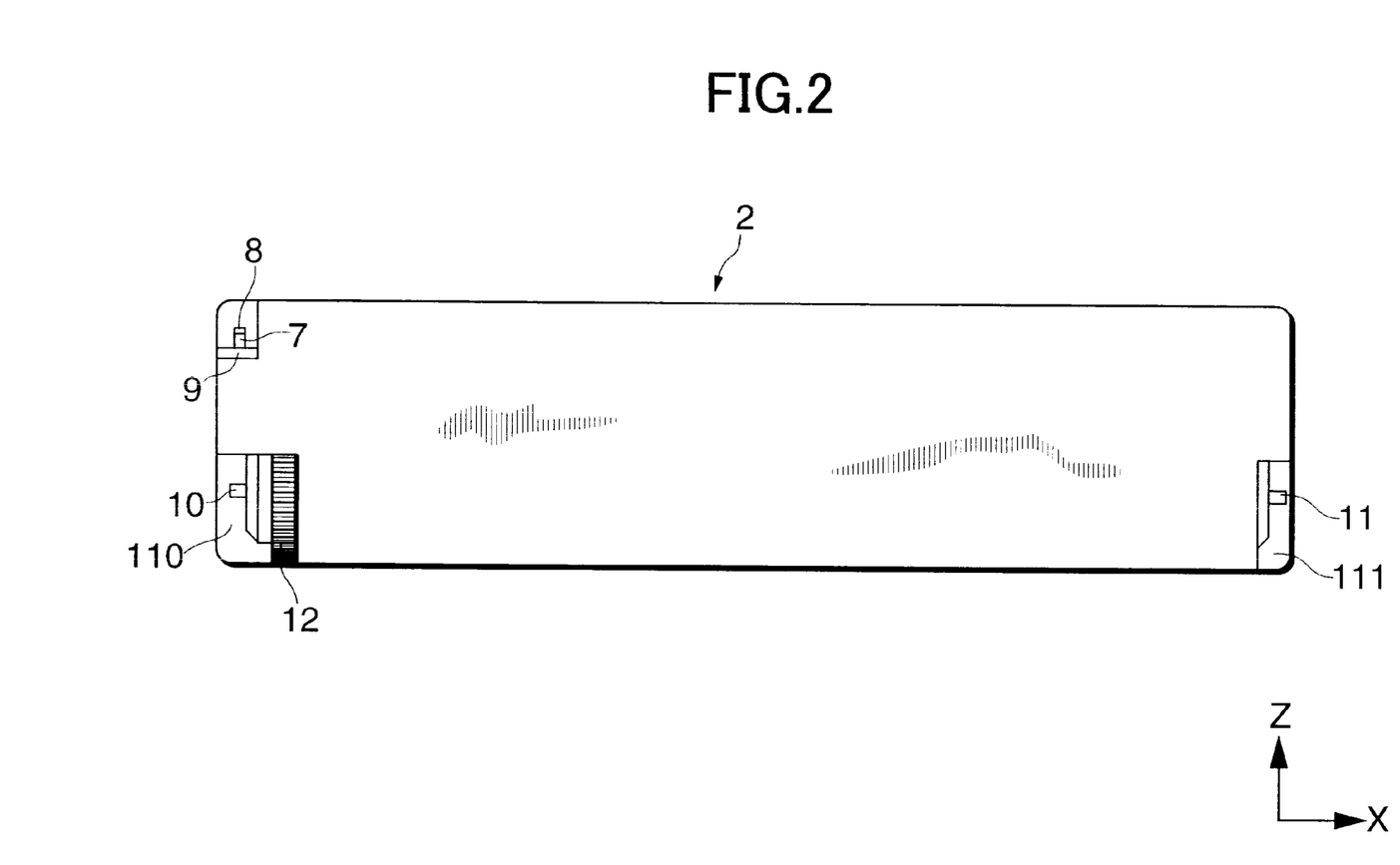
FIG. 2 is a back view of a flap body (operation flap) of the recording medium reproducing apparatus.

At first, FIG. 1 and FIG. 2 are used to illustrate the structure of a flap body 2 (it may also be called operation flap, since it is a flap body provided with a display section and button operating section) forming part of a recording medium reproducing apparatus 1 made according to the present invention. In detail, FIG. 1 is a perspective view schematically indicating the recording medium reproducing apparatus, FIG. 2 is a back view of the flap body 2.

As shown in FIG. 1, the recording medium reproducing apparatus 1 comprises a flap body 2 and an apparatus main body 3.

The flap body 2 is provided with various operating functions, such as a horizontally arranged elongated display section 4 for providing a user with various informations, and a plurality of push buttons 5 located below the display section 4.

Further, the flap body 2 has a locking action releasing button 6 disposed on an upper corner thereof (FIG. 1). A protruding member 7 (FIG. 2) extending in direction Y is attached to the lock action releasing button 6 in a manner shown in FIG. 2. In fact, the protruding member 7 is protruding through an insertion hole 8 formed on the back surface of the flap body 2. This protruding member 7 is so provided that it can move within a predetermined distance in direction Y when the locking action releasing button 6 is pushed by a user.

An engaging projection 9, which has been formed for engaging the flap body 2 on to the apparatus main body 3, is protrudingly formed on the back surface of the flap body 2 in the vicinity of the insertion hole 8. In fact, this engaging projection 9 is extending in direction Y and has a guide groove (not shown) also extending in direction Y on its internal bottom surface. The guide groove (not shown) is so formed that it can guide the movement of the protruding member 7.

As shown in FIG. 2, the back surface of the flap body 2 has a pair of recess portions 110 and 111 formed on both lower ends thereof, a pair of pivotal shafts 10 and 11 protruding in direction X are coaxially provided in the recess portions 110 and 111, a fixed gear portion 12 (a first gear) coaxial with the pivotal shaft 10 is formed in the vicinity of the pivotal shaft 10.

Figure 3:
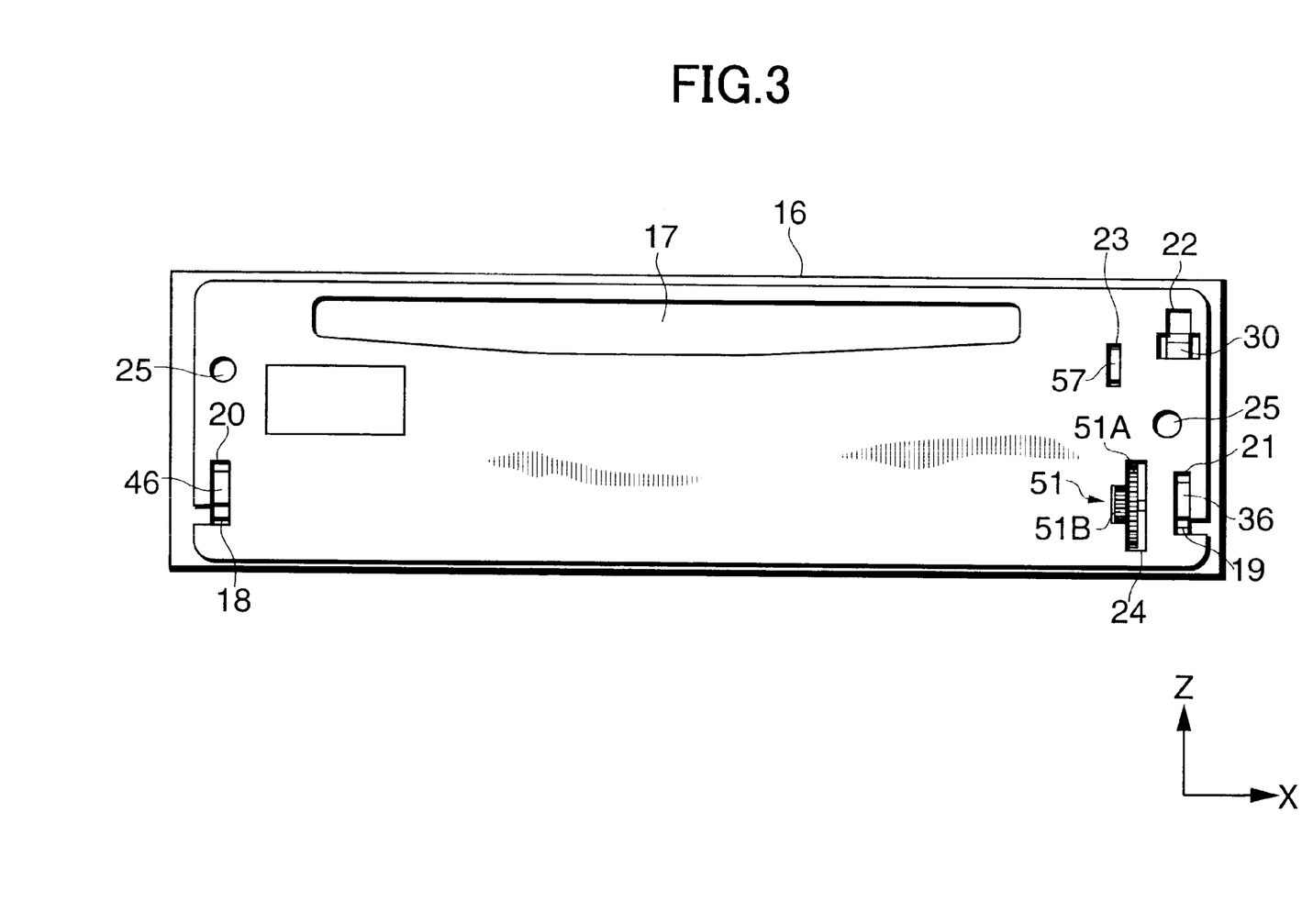
FIG. 3 is a front view of the main body of the recording medium reproducing apparatus, with the flap body removed therefrom for better illustration.

Next, the apparatus main body 2 of the recording medium reproducing apparatus 1 will be described with reference to FIG. 1 and FIG. 3. In fact, FIG. 3 is a front view of the apparatus main body 3 from which the flap body 2 has been detached.

Actually, the apparatus main body 3 has a predetermined outer size designed in accordance with predetermined standards and is adapted to be installed into a vehicle console box.

A chassis of the apparatus main body 3 includes a bottom plate 13, a pair of mutually facing side walls 14 and 15 formed on both sides of the bottom plate 13 by virtue of bending an identical plate. A loading mechanism (not shown) and a recording medium reproducing device (not shown) are disposed on the bottom plate 13.

Referring again to FIG. 1 and FIG. 3, a rectangular front panel 16 is provided on the front of the chassis (consisting of the bottom plate 13, the side walls 14 and 15). This front panel 16 is formed with an elongated insertion hole 17 extending in direction X, so that a recording medium such as a CD may be horizontally inserted into the apparatus main body 3.

Further, as shown in FIGS. 1 and 3, the front panel 16 is integrally formed with a pair of protruding members 18 and 19 located on the left and right sides. Two openings 20 and 21 are formed on the front panel 16 in positions adjacent to and higher than the protruding members 18 and 19. Moreover, as shown in FIG. 3, openings 22, 23 and 24 of different shapes are formed close to the right side on the front panel 16. In FIG. 3, reference numeral 25 is used to represent a screw hole formed on the front panel 16.

A flap body attaching/detaching mechanism for use in the recording medium reproducing apparatus 1 will be described in the following with reference to FIG. 4 and FIG. 5.

Figure 4:
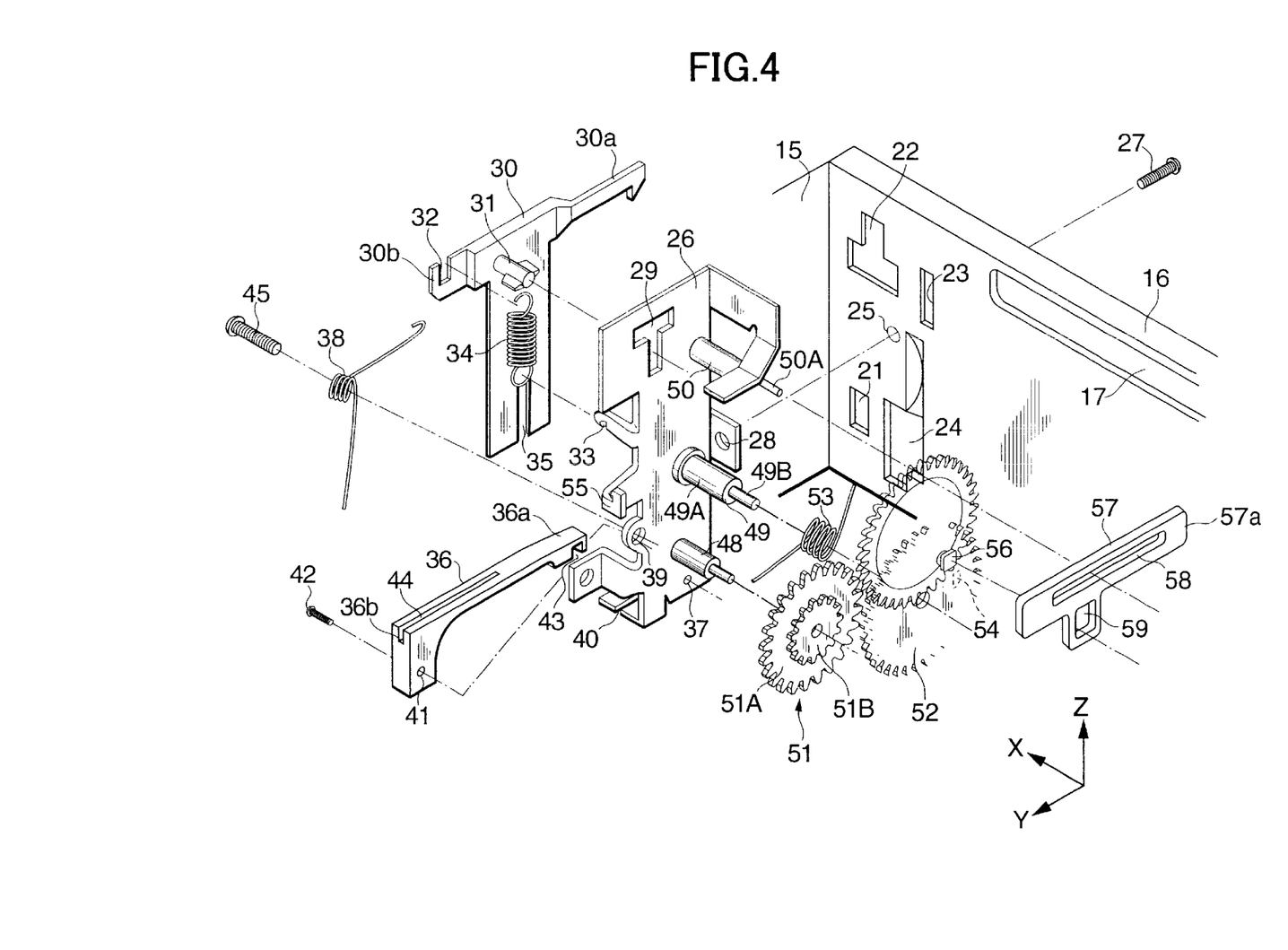
FIG. 4 is an exploded perspective view indicating some important parts of a flap body opening/closing mechanism and a flap body attaching/detaching mechanism.
Figure 5:
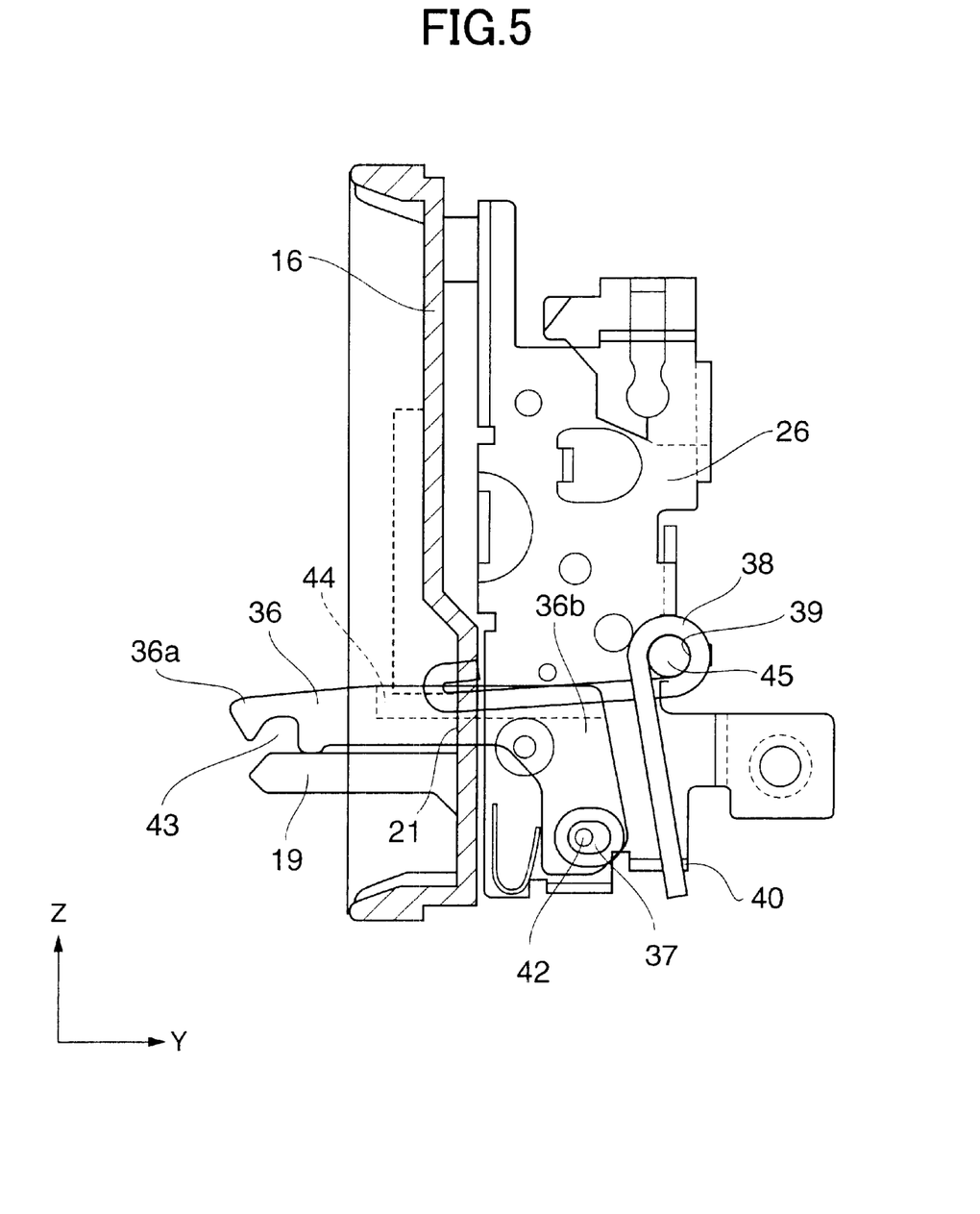
FIG. 5 is a side view indicating a part of the flap body attaching/detaching mechanism.

FIG. 4 is an exploded perspective view indicating a flap body opening/closing mechanism and a flap body attaching/detaching mechanism which are to be installed in the apparatus main body 3. FIG. 5 is a side view indicating part of the attaching/detaching mechanism when viewed from the side wall 15.

As shown in the drawings, a support plate 26, which is used to support the opening/closing mechanism and the attaching/detaching mechanism, is fixed by a screw 27 in a predetermined position between an end of the elongated insertion opening 17 and the side wall 15. In FIG. 4, reference numeral 28 is used to represent a screw bole formed on the support plate 26 for receiving the screw 27.

Referring again to FIG. 4, a T-shaped through hole 29 is formed on the support plate 26, a first arm member 30 is provided between the support plate 26 and the side wall 15, a projection 31 formed on the first arm member 30 can slidably engage into the T-shaped through hole 29.

The first arm member 30 has a generally L-shaped configuration including a front end 30a so formed that it can be inserted through the opening 22 of the front panel 16 and can engage the projection 9 formed on the back surface of the flap body 2. Further, the first arm member 30 has an upwardly facing hook portion 32 formed on its rear end 30b. Moreover, a coiled spring 34 is provided, with one end thereof attached to a hook portion 33 formed on the support plate 26, and the other end thereof attached to the hook portion 32 of the first arm member 30. In this way, the first arm member 30 is urged downwardly by virtue of a spring force of the coiled spring 34.

Furthermore, the first arm member 30 is formed with a vertically arranged and downwardly facing guide groove 35. A projection (not shown) formed on one side of the support member 26 is allowed to slidably engage in the guide groove 35, so that the first arm member 30 may be made stable when moving up and down in direction Z.

On the lower area of the support plate 26 there are formed shaft holes 37, 39 and a groove 40. In detail, the shaft hole 37 is used to pivotably support a second arm member 36 by means of a screw 42, the shaft hole 39 is used to support an urging spring 38 by means of a screw 45 in order that the second arm member 36 may be downwardly urged by virtue of the urging spring 38, the groove 40 is used to be engaged by one end of the urging spring 38.

Here, the second arm member 36 is also located in a position between the side wall 15 and the support plate 26. A screw hole 41 is formed through the lower end of the second arm member 36, with its axial direction being coincident with that of the shaft hole 37 of the support plate 26. After an engaging pin 42 is inserted through the hole 41 of the second arm member 36 and the hole 37 of the support plate 26, the second arm member 36 may be allowed to pivot freely about the hole 41.

The upper portion of the second arm member 36 is formed to extend in direction Y and its front end 36a is inserted through an opening 21 of the front panel 16 so as to arrive at the upper side of the protruding member 19 formed on the front panel 16 (FIG. 1). With the second arm member 36 inserted in the opening 21, a protruding length of the second arm member 36 beyond the opening 21 is set to be slightly longer than that of the protruding member 19.

The lower side of the front end 36a of the second arm member 36 is formed into an inverted U-shaped recess portion 43. In this way, a clamp structure is formed by the inverted U-shaped recess portion 43 and the protruding member 19, so that the pivotal shaft 10 of the flap body 2 may be freely pivotably clamped therebetween in the vertical direction.

On the other hand, an elongated groove 44 extending in direction Y is formed on the upper surface of the second arm member 36 close to the rear end thereof. One end of the urging spring 38 generally extending in direction Y is allowed to engage into the elongated groove 44.

In detail, the urging spring 38 is a rolled spring which is provided between the side wall 15 and the support plate 26, and is fixedly attached by means of a screw 45 on one side of the support plate 26. The other end of the urging spring 38 is allowed to engage into the groove 40 of the support plate 26. In this way, the urging spring 38 will exert a predetermined pressing force on the second arm member 36. Such kind of pressing force will cause the front end 36a of the second arm member 36 to have a freely pivotal movement (in the vertical direction) about the hole 41 of the second arm member 36, thereby constantly urging the the front end 36a of the second arm member 36 in a downward direction.

In fact, as shown in FIG. 1, close to the side wall 14 there is provided a third arm member 46 (which is similar to the second arm member 36 and its protruding portion is urged downwardly by a similar urging spring). Similarly, the third arm member 46 is formed with a similar inverted U-shaped recess portion 47. In this way, a clamp structure is formed by the inverted U-shaped recess portion 47 and the protruding member 18, in the same manner as described in the above concerning the second arm member 36 and the protruding member 19.

With the use of the above structure, the pivotal shaft 10 of the flap body 2 is pivotably and detachably clamped in the vertical direction between the protruding member 19 and second arm member 36, the pivotal shaft 11 of the flap body 2 is pivotably and detachably clamped in the vertical direction between the protruding member 18 and third arm member 46. In this way, the flap body 2 is allowed to have a freely pivotal movement about the pivotal shafts 10 and 11 relative to the apparatus main body 3.

A flap body opening/closing mechanism will be described in the following with reference to FIGS. 4 to 6.

Figure 6:
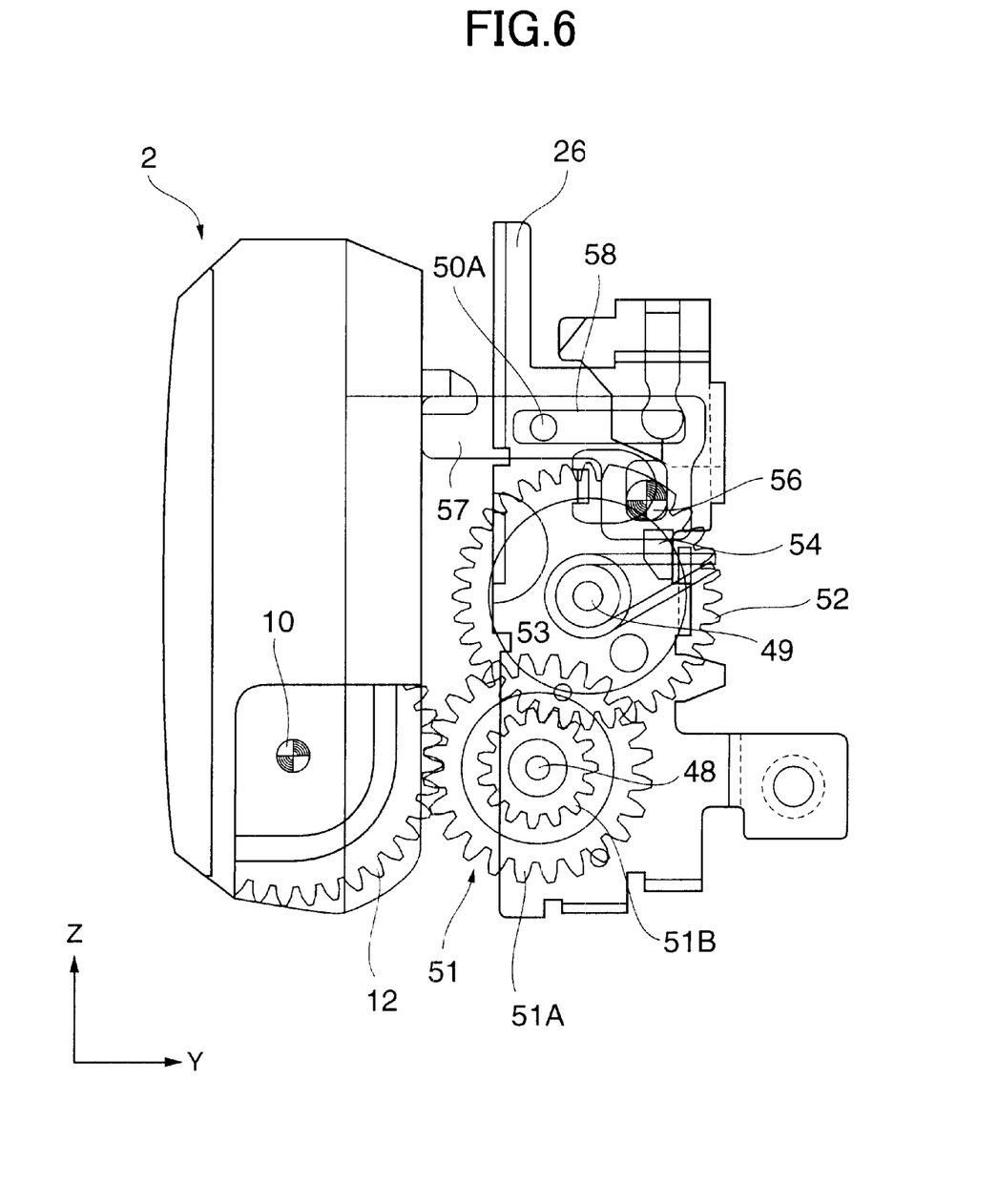
FIG. 6 is a side view indicating a part of the flap body opening/closing mechanism.

FIG. 6 is a side view schematically indicating a flap body opening/closing mechanism when viewed from the side wall 15.

As shown in the drawings, on one side of the support plate 26 there are provided several support shafts 48, 49 and 50 which are protruding in direction X and are separated from one another with a predetermined interval.

Referring to FIGS. 4 and 6, on the front end of the support shaft 48 (positioned on the lower side of the support plate 26) there is provided a gear assembly including one large gear 51A (a second gear) and one small gear 51B (a third). As shown in FIG. 1, the large gear 51A is partially projected through the opening 24 of the front panel 16, so as to engage with the fixed gear portion 12 (a first gear) formed on the back surface of the flap body 2. On the other hand, the small gear 51B is allowed to engage with a gear 52 (a fourth gear) supported by the shaft 49 provided on generally central position of the support plate 26 (FIG. 6).

As shown in FIG. 4, an urging spring 53 is attached on a large diameter portion 49A of the shaft 49, the gear 52 is freely rotatably attached on a small diameter portion 49B of the shaft 49. A projection 54 is formed on the gear 52 in a manner such that it faces the support plate 26. In this way, one end of the urging spring 53 is allowed to get in tight contact with the upper side of the projection 54, while the other end of the urging spring 53 is allowed to engage an engaging member 55 formed on the support plate 26. Therefore, the gear 52 is urged so as to have a tendency to be rotated in a clockwise direction (when viewed from side wall 15), with the small diameter portion 49B serving as a rotation center.

The other side of the gear 52 is provided with a projection 56 protruding in direction X. This projection 56 is adapted to engage a fourth arm member 57 supported by a shaft 50 fixed on the support plate 26.

The shaft 50 is fixed on the upper portion of the support plate 26 and has a small diameter portion 50A which is allowed to slidably engage in an elongated hole 58 formed on the fourth arm member 57 and extending in direction Y. Namely, by virtue of the small diameter portion 50A of the shaft 50, the fourth arm member 57 is allowed to slide within the length of the elongated hole 58 in direction Y.

Further, a cam hole 59 extending in direction Z is formed on the lower side of the fourth arm member 57. The cam hole 59 is engaged by the projection 56 of the gear 52.

The upper portion of the fourth arm member 57 extends in direction Y. A front end 57a of the fourth arm member 57 is a allowed to insert through an opening 23 formed on the front panel 16 and can thus protrude to a spacial position in front of the front panel 16. In this way, with the rotation of the gear 52, the fourth arm member 57 will be caused to move back and forth within a predetermined distance in direction Y.

With the use of the above structure, when the flap body 2 is not attached to the front of the front panel 16, an urging force of the urging spring 53 will cause the gear 52 to rotate in the clockwise direction, thereby rendering the fourth arm member 57 connected with the gear 52 to move to a spacial position in front of the front panel 16.

On the other hand, when the flap body 2 is attached to the front of the front panel 16, the fourth arm member 57 will be pressed back by the back face of the flap body 2 so that the arm member 57 will be moved back in direction Y. In this way, the gear 52 connected with the arm member 57 will be caused to rotate in the counter clockwise direction, acting against the urging force of the urging spring 53.

In this way, the rotation of the gear 52 and the linear movement of the fourth arm member 57 will be effected at the exactly the same time.

The above described structure forms a flap body attaching/detaching mechanism and a flap body opening/closing mechanism extending (in the lateral direction of the apparatus main body 3) from an end of the elongated insertion opening 17 to the side wall 15 of the apparatus main body 3. Therefore, formation of these mechanisms occupies only vary small spaces and thus leaves a large space for a loading mechanism and a reproducing device, thereby effectively preventing an increase in the size of the apparatus main body.

Next, the operations of the flap body attaching/detaching mechanism and the flap body opening/closing mechanism of the present invention will be described in th e following with reference to FIGS. 7, 8 and 9.

Figure 7:
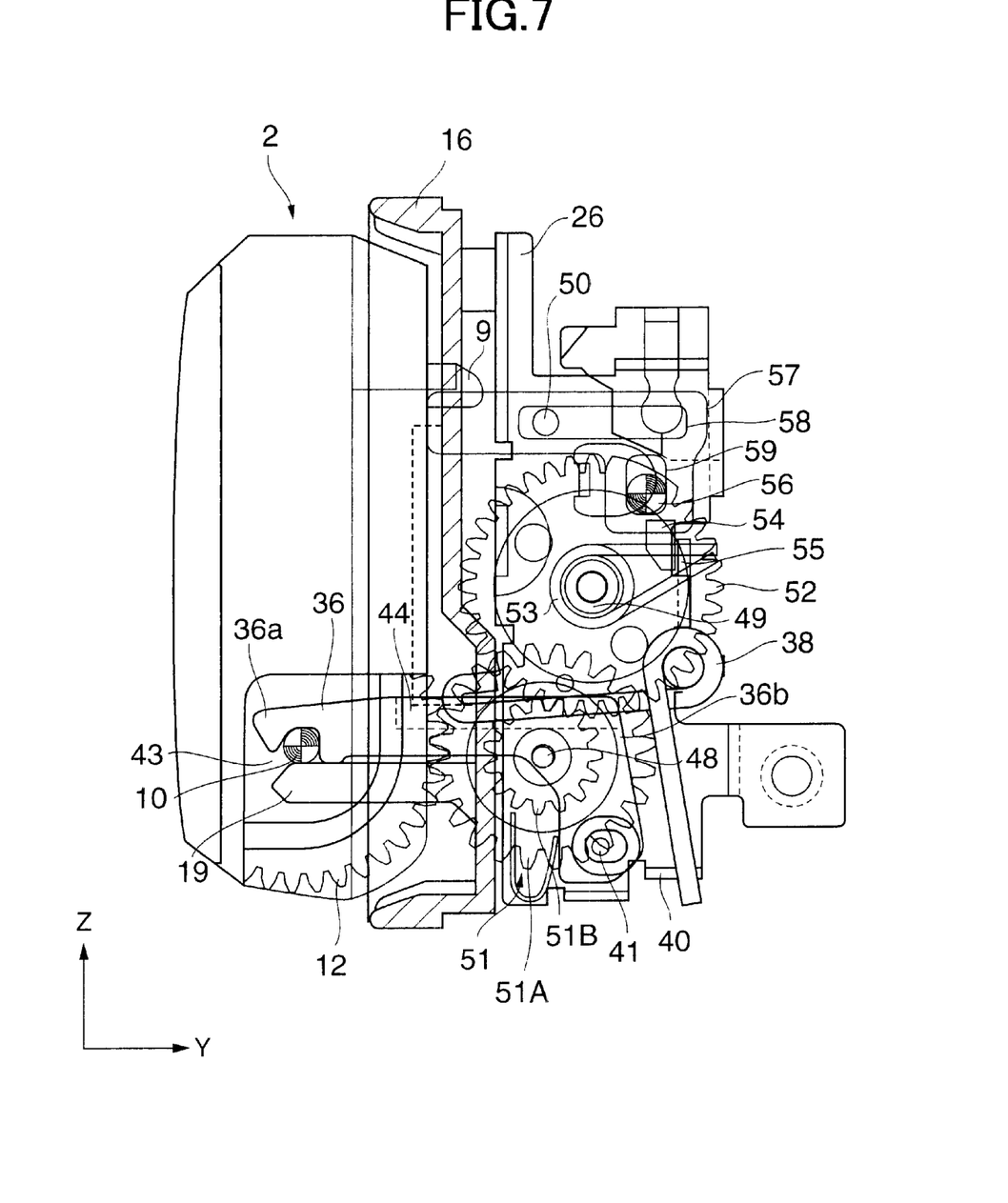
FIG. 7 is an explanatory view indicating a flap body opening/closing operation.
Figure 8:
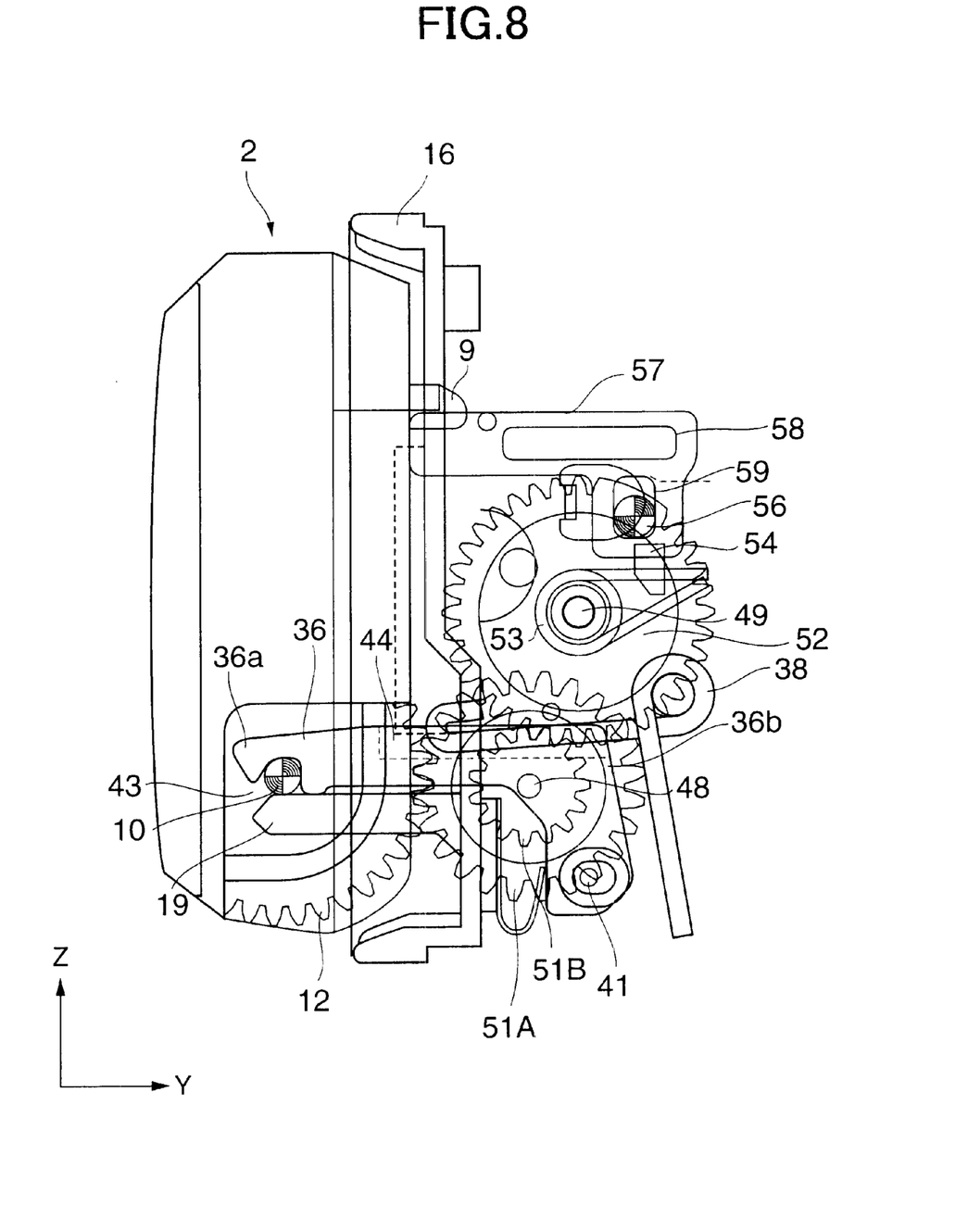
FIG. 8 is an explanatory view indicating a flap body. opening/closing operation.
Figure 9:
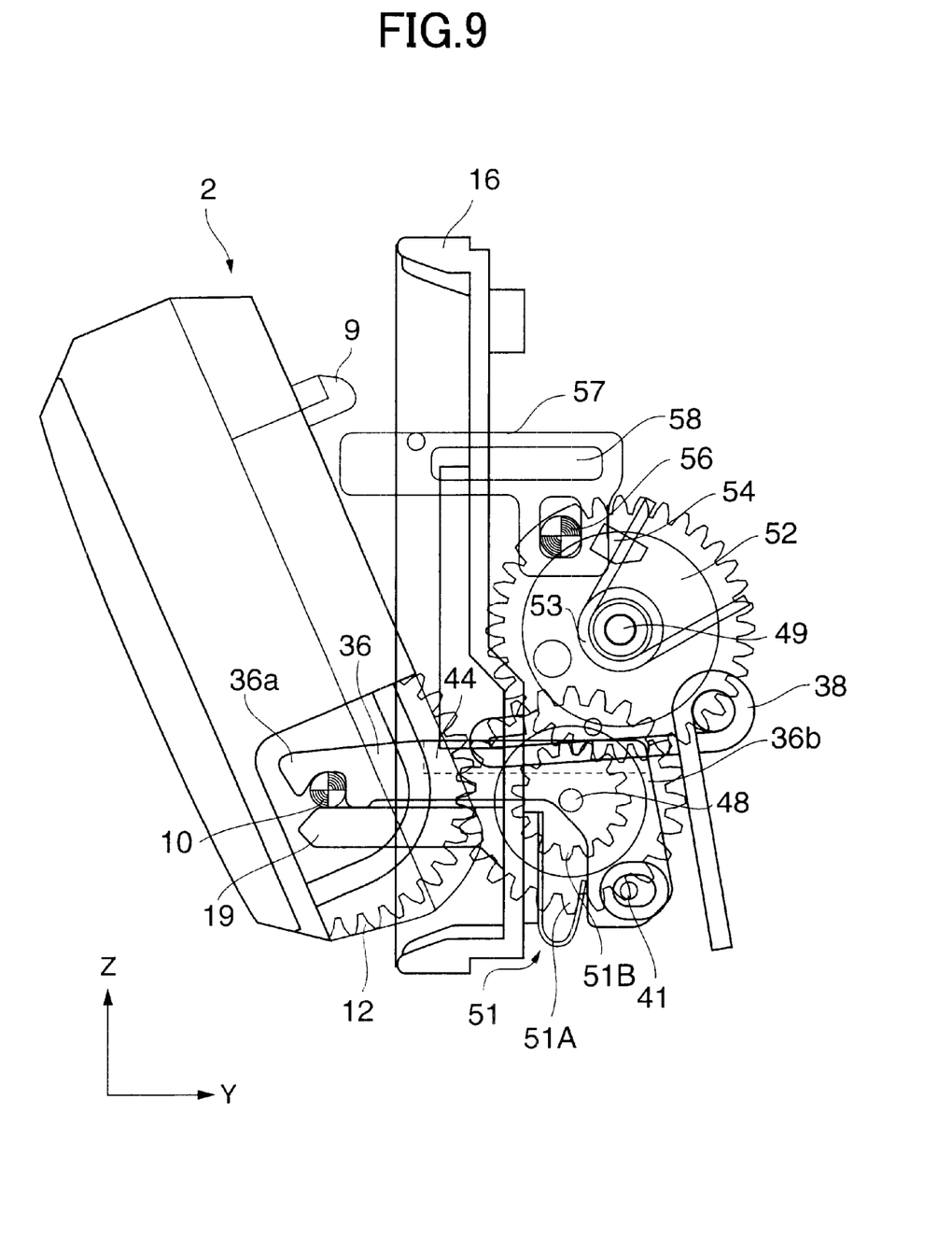
FIG. 9 is an explanatory view indicating a flap body opening/closing operation.

In fact, FIGS. 7, 8 9 are explanatory views indicating the operations of the flap body attaching/detaching mechanism and the flap body opening/closing mechanism, with all these mechanisms viewed from the side wall 15 of the apparatus main body 3.

In practice, a flap body attaching/detaching mechanism close to the side wall 14 is the same as the flap body attaching/detaching mechanism close to the side wall 15. Therefore, similar explanation for the attaching/detaching mechanism close to the side wall 14 will be omitted here.

FIG. 7 is used to illustrate an arrangement in which the flat body 2 has been attached on the front panel 16. At this time, the pivotal shaft 10 of the flap body 2 is clamped between the second arm member 36 (serving as a clamping member) and the protruding member 19 (close to the side wall 15), while the pivotal shaft 11 of the flap body 2 is clamped between the third arm member 46 (serving as a clamping member) and the protruding member 18 (close to the side wall 14). At this moment, the engaging projection 9 formed on the back surface of the flap body 2 is engaged with the front end 30a of the first arm member 30, thereby effecting a desired engagement between the back surface of the flap body 2 and the front panel 16 of the apparatus main body 3.

Further, when the flap body 2 has been attached to the front panel 16 of the apparatus main body 3, the elongated insertion opening 17 of the front panel 16 is closed by the back surface of the flap body 2, and the fourth arm member 57 is pressed in direction Y by the back surface of the flap body 2. In this way, the fourth arm member 57 have a tendency to cause the gear 52 (connected with the arm member 57) to rotate in the clockwise direction against the urging force of the urging spring 53. At this moment, the gear 51A of the two-gear assembly 51 is engaged with the fixed gear portion 12 of the flap body 2, so that the gear 51A (having a tendency to be rotated in the counter clockwise direction) has a tendency to further cause the gear 52 to rotate in the clockwise direction through the gear 51B.

Then, the locking action releasing button 6 of the flap body 2 is pushed so that the protruding member 7 will be pushed in direction Y so as to reach the lower side of the front end 30a of the first arm member 30. At this moment, the front end 30a of the first arm member 30 will be moved upwardly a little against the urging force of the coiled spring 34, so that the front end 30a itself will get off the engaging projection 9 formed on the back surface of the flap body 2.

In this way, the flap body 2 which is freely pivotable about the shafts 10 and 11, is allowed to pivot away from the front panel 16 by virtue of a protruding force of the fourth arm member 57 (which is moved to the left in the drawings by the gear 52 that is rotated in the counter clockwise direction by virtue of a restoring force of the urging spring 53) and an action of the fixed gear portion 12 of the flap body 2 (the fixed gear portion 12 is engaged with the gear 51A of the two-gear assembly 51 that is rotated in the clockwise direction by the gear 52).

In this manner, since the opening of the flap body 2 is effected by a restoring force of the urging spring 53, such an opening action may be accomplished at a constant speed. Accordingly, even when the front end 57a of the fourth arm member 57 is separated from the back surface of the flap body 2, the flap body 2 will continue its pivoting movement by virtue of the gear 52 (still rotating), so that the fixed gear portion 12 (engaged with the gear 51A rotating in the clockwise direction) will be caused to rotate in the counter clockwise direction. Therefore, the flap body 2 is able to continue its pivoting movement so as to expose the elongated insertion opening 17.

On the other hand, once the gear 52 stops its rotation, the fixed gear portion 12 engaged with the gear 51A will also stop its rotation, so that the pivoting movement of the flap body 2 is stopped. Then, a user is allowed to use a relatively large drawing force to outwardly draw the flap body 2. In this way, the pivotal shaft 10 is allowed to slip from between the protruding member 19 and the second arm member 36, while the pivotal shaft 11 is allowed to slip from between the protruding member 18 and the third arm member 46, thereby completing the detachment of the flap body 2 from the apparatus main body 3.

Next, an attachment operation for attaching the flap body 2 on to the apparatus main body 3 will be described in the following.

Namely, when the flap body 2 is to be attached to the apparatus main body 3, the flap body 2 is at first made horizontal in a manner such that its bottom edge is caused to face the front panel 16. Then, the pivotal shaft 10 of the flap body 2 is inserted between the second arm member 36 and the protruding member 19, while the pivotal shaft 11 of the flap body 2 is inserted between the third arm member 46 and the protruding member 18.

Subsequently, a relatively large pressing force is applied to the flap body 2, so that the pivotal shaft 10 will acts to cause the free end of the second arm member 36 to move upwardly a little against the urging force of the urging spring 38, thereby slightly separating the front end of the second arm member 36 from the protruding member 19, and thus allowing the pivotal shaft 10 to engage into the inverted U-shaped recess portion 43.

At the same time, the pivotal shaft 11 will acts to cause the free end of the third arm member 46 to upwardly move a little against the urging force of another urging spring (not shown), thereby slightly separating the front end of the third arm member 46 from the protruding member 18 and thus allowing the pivotal shaft 11 to engage into the inverted U-shaped recess portion 47. At this moment, the gear 51A of the two-gear assembly 51 is engaged with the fixed gear portion 12 of the flap body 2.

Afterwards, the flap body 2 is pivoted about the pivotal shafts 10 and 11 in the clockwise direction in the drawings. In this way, the gear portion 12 is caused to rotate in the clockwise direction so that the gear 51A is rotated in the counter clockwise direction. As a result, the gear 52 is caused to rotate in the clockwise direction through the gear 51B.

Thus, the flap body 2 is gradually pivoted about the pivot shafts 10 and 11 so as to be attached on to the front panel 16 of the apparatus main body 3. Meanwhile, the engaging projection 9 formed on the back surface of the flap body 2 will be engaged by the front end 30a of the first arm member 30 protruding through the front panel 16, thereby slightly raising the front end 30a. Upon the completion of the engagement between the front end 30a of the first arm member 30 and the engaging projection 9 of the flap body 2, an entire operation for attaching the flap body 2 on to the apparatus main body 3 is thus finished.

With the use of the above described invention, since the backward movement of the fourth arm member 57 will cause the two-gear assembly 51 to rotate in the counter clockwise direction, even if the flap body 2 is vertically (with its back surface in a vertical position) attached on to the apparatus main body 3, or even if the flap body 2 is attached in an inclined manner on to the apparatus main body 3, the fourth arm member 57 will be pressed all the same by the back surface of the flap body 2, thereby permitting the flap body 2 to be smoothly attached on to the apparatus main body 3 by virtue of the engagement between the gear portion 12 and the two-gear assembly 51.

However, the flap body opening/closing mechanism shown in FIG. 1 does not have to be necessarily limited to the right side position as shown in the accompanying drawings, it is in fact also possible to have the flap body opening/closing mechanism located on the left side.

In this way, the recording medium reproducing apparatus comprises: an apparatus main body having a recording medium insertion opening; a flap body adapted to be attached to the apparatus main body so as to close the insertion opening; a first gear formed on the flap body, said first gear being coaxial with pivotal shafts of the flap body; a second gear provided in the apparatus main body and engageable with the first gear formed on the flap body; an arm member protruding from the front side of the apparatus main body, said arm member being retractable into the apparatus main body upon being pressed by the flap body when the flap body is closed on the apparatus main body; an interlock mechanism for simultaneously effecting the protrusion or retraction of the arm member and the rotation of the second gear provided in the apparatus main body; a first urging means for urging the interlock mechanism so as to cause the arm member to outwardly project to its fully projected position. Therefore, the above arm member may be urged to its projected position so as to open the flap body, and thus the flap opening speed may be made constant by virtue of the interlock mechanism, so that the flap body may be opened in a smooth manner, thereby improving an operating feeling when opening the flap body.

While the presently preferred embodiments of the this invention have been shown and described above, it is to be understood that these disclosures are for the purpose of illustration and that various changes and modifications may be made without departing from the scope of the invention as set forth in the appended claims.

What is claimed is:

1. An apparatus for reproducing recording medium, comprising:
    a main body having a front side;
    a flap body adapted to be fitted to and detachable from the front side of the main body;
    a shaft provided on the flap body, wherein the shaft extends in a side to side direction of the flap body that is parallel to the front side of the main body;
    a pinching device provided in the main body for pinching the shaft provided on the flap body, the pinching device having a pair of protuberant arms protruding from the front side of the main body that detachably and rotatably pinch the shaft therebetween; and
    an urging member provided within the main body, wherein the pair of protuberant arms include a movable arm and a fixed protruding arm,
    wherein the main body detachably and rotatably holds the flap body via the pair of protuberant arms of the pinching device, and
    wherein the movable arm can pinch the shaft against the fixed arm using the urging member.

2. The apparatus according to claim 1, wherein the main body has two pinching devices.

3. The apparatus according to claim 1, wherein the urging member is a coiled spring.

4. An apparatus for reproducing recording medium, comprising:
    a main body having a front side;
    a flap body adapted to be fitted to and detachable from the front side of the main body;
    a shaft provided on the flap body, wherein the shaft extends in a side to side direction of the flap body that is parallel to the front side of the main body;
    a pinching device provided in the main body for pinching the shaft provided on the flap body, the pinching device having a pair of protuberant arms protruding from the front side of the main body that detachably and rotatably pinch the shaft therebetween, a first gear formed on the flap body, the first gear being fixed on and coaxial with the shaft on the flap body;
    a second gear provided in the main body and engageable with the first gear;
    a retractable arm member protruding from the main body, the retractable arm member being retractable into the main body upon being pressed by the flap body when the flap body is caused to cover on insertion opening of the main body, a movement of the retractable arm member being parallel to an insertion direction of the recording medium;
    an interlock mechanism working together with the movement of the retractable arm member and a rotation of the second gear; and
    a first urging member for urging the interlock mechanism so as to cause the retractable arm member to outwardly project to a fully projected position,
    wherein the main body detachably and rotatably holds the flap body via the pair of protuberant arms of the pinching device, and
    wherein the main body comprises the insertion opening for inserting a recording medium therein, the flap body being adapted to be fitted to the main body so as to close the insertion opening.

5. The apparatus according to claim 4, wherein the interlock mechanism comprises:
    a third gear coaxial with the second gear;
    a fourth gear which engages the third gear and is urged by the first urging member in a circumferential direction of the fourth gear;
    a projection formed on a first side of the fourth gear; and
    an engaging portion formed on the retractable arm member that engages the projection of the fourth gear.

6. The apparatus according to claim 5, wherein the first urging member is a coiled spring capable of urging the fourth gear in a rotational direction of the fourth gear.

* * * * *